(12) United States Patent
Chen et al.

(10) Patent No.: US 7,162,095 B2
(45) Date of Patent: Jan. 9, 2007

(54) METHOD OF AUTOMATICALLY DETERMINING THE REGION OF INTEREST FROM AN IMAGE

(75) Inventors: Oscal T. -C. Chen, Taipei (TW); Chih-Chang Chen, Tainan (TW); Horng-Shinn Wu, Hualien (TW)

(73) Assignee: National Chung Cheng University, Chiai (TW)

( * ) Notice: Subject to any disclaimer, the term of this patent is extended or adjusted under 35 U.S.C. 154(b) by 784 days.

(21) Appl. No.: 10/460,362

(22) Filed: Jun. 13, 2003

(65) Prior Publication Data

US 2004/0252903 A1     Dec. 16, 2004

(51) Int. Cl.
G06K 9/46 (2006.01)
G06K 9/62 (2006.01)

(52) U.S. Cl. .................................................... 382/240
(58) Field of Classification Search ................ 382/172, 382/173, 224, 232, 233, 240, 243, 245, 247, 382/250, 251, 257, 284; 341/50, 51; 375/240.03, 375/240.19, 240.2, 240.23; 348/222.1, 333.03, 348/346, 362
See application file for complete search history.

(56) References Cited

U.S. PATENT DOCUMENTS

| | | | | |
|---|---|---|---|---|
| 6,757,434 B1 * | 6/2004 | Miled et al. | ................. | 382/236 |
| 6,853,318 B1 * | 2/2005 | Rabbani et al. | ............... | 341/50 |
| 6,882,755 B1 * | 4/2005 | Silverstein et al. | ......... | 382/282 |
| 6,904,176 B1 * | 6/2005 | Chui et al. | ................... | 382/240 |
| 6,917,384 B1 * | 7/2005 | Fukushima | ............ | 348/333.03 |
| 6,993,199 B1 * | 1/2006 | Chebil | ......................... | 382/240 |
| 7,039,250 B1 * | 5/2006 | Kuroiwa | ..................... | 382/248 |

* cited by examiner

Primary Examiner—Amir Alavi
(74) Attorney, Agent, or Firm—Rosenberg, Klein & Lee (57) ABSTRACT

A method for automatically determining the region of interest from an image comprises the three steps of (a) analyzing content of the transformed coefficients of an image after a discrete signal transformation and partitioning an image into the interested region and background region that are based on p×p-pixel sub-blocks for performing classification; (b) locating the central point of the interested sub-blocks; and (c) integrating a plurality of the interested sub-blocks from said central point to the boundary of an image to generate a closed and continued region of interest by using a image processing technique with considering the bit-rate requirement.

16 Claims, 6 Drawing Sheets

Figure 7E 0.3 bpp 0.5 bpp 0.8 bpp 2.0 bpp

Figure 8A         Figure 8B

METHOD OF AUTOMATICALLY DETERMINING THE REGION OF INTEREST FROM AN IMAGE

BACKGROUND OF THE INVENTION

1. Field of the Invention

This invention relates to the method of automatically determining the region of interest (ROI) from an image during an encoding process, more particularly, to a method of generating the effective ROI mask improving the quality of the decoded image for applications of image compression.

2. Description of the Prior Art

According to development and advancement of information technology, the information of speech, audio, image and video is transmitted by the wireless or wired channel, such as the personal mobile phone or internet, to reach the multimedia transmission. In addition, it is difficult to store a large amount of multimedia information. Consequently, the multimedia information must be compressed for the purposes of transmission and storage.

The Joint Photographic Experts Group (JPEG) was organized under ISO and ITU-T in 1986 for developing and promoting the still image compression standards, such as JPEG and JPEG 2000. Presently, the discrete cosine transform (DCT) or discrete wavelet transform (DWT) are utilized to reduce the spatial redundancy in most of the image and video compression standards, including JPEG, JPEG 2000, MPEG-1, MPEG-2, MPEG-4, H.261, H.263+ and so on. In the JPEG compression, an image frame is partitioned into many 8×8-pixel blocks where the 8×8-pixel block is a coding unit. For each block, the DCT, quantization and entropy coding are performed to compress the image. On the other hand, the JPEG 2000 utilizes the DWT to remove the spatial redundancy for compressing an image. Additionally, the transformed coefficients go through bit-plane coding, arithmetic coding and bit-stream arrangement to accomplish the compression process.

Figure 1:
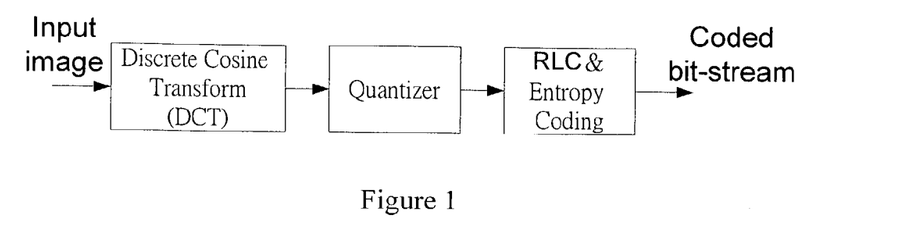
FIG. 1 is a block view showing the compression steps of the JPEG standard of the prior art.

FIG. 1 shows the coding process of the JPEG where an image frame is partitioned into many 8×8-pixel blocks, each of which is transformed by the DCT to obtain the DCT coefficients. Further, the DCT coefficients are quantized, and then go through run length coding and entropy coding to create the encoded bit-stream. The main property of the DCT is energy compaction effect which causes the transformed coefficients displayed from the low-frequency components at the left-upper region to the high-frequency components at the right-lower region of an 8×8-pixel block. From this property, the statistic characteristics of low-frequency or high-frequency components can be investigated to determine and generate the ROI during compression process according to the bit-rate requirement.

Figure 2:
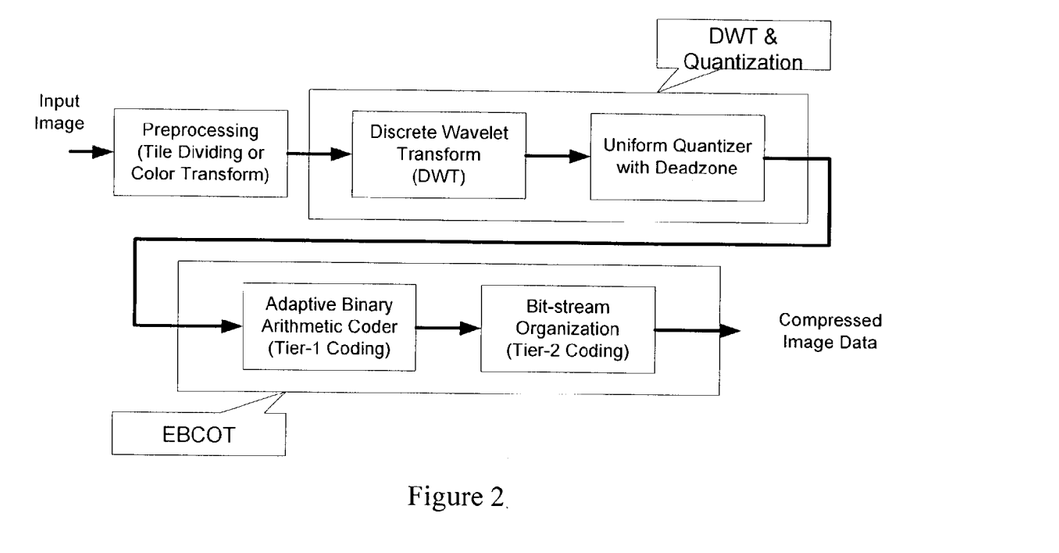
FIG. 2 is a block view showing the compression steps of the JPEG 2000 standard of the prior art.

As compared to the JPEG, the JPEG 2000 has many features such as a high compression rate, an embedded bit stream, multiple resolution representation, lossy and lossless compression, ROI and error resilience, et al. Especially, the ROI enhances the picture quality at the interested region during the lossy compression for transmission at a limited bandwidth. The compression standard of the JPEG 2000 has six parts where the part 1 builds a basic compression standard, and the part 2 to part 6 are expanded from the part 1. In the JPEG 2000, an image frame goes through the discrete wavelet transform (DWT) and its transformed coefficients are then quantized. The transformed coefficients after quantization are partitioned into N×N-pixel codeblocks where each codeblock is processed by using bit-plane coding. With a bit-plane as the coding unit, a codeblock is processed by the embedded block coding with optimized truncation (EBCOT), including pass coding and arithmetic coding, bit-plane by bit-plane to yield a high-efficiency embedded bit stream. Referring to FIG. 2, the coding process of JPEG 2000 comprises the three steps of:

1. Providing the pre-process of an image frame, including tile dividing and color transform where the size for tile dividing is determined by the system requirement and each tile divided from an image frame is used for color transform;
2. Providing the block after the color transform for going through the DWT to remove the spatial redundancy and the transformed coefficients are quantized; and
3. Coding the transformed coefficients after quantization be bit-plane by the EBCOT to eliminate the bit redundancy to generate an output bit stream based on the packed unit.

The JPEG 2000 in the part 1 provides the option of the ROI coding that would sacrifice image quality of the uninterested region to improve image quality of the interested region. In the JPEG 2000 coding process, the ROI is firstly coded to yield a bit stream and has good visual quality at a limited bandwidth so that the ROI coding is very important in applications of internet and wireless communications. The picture content of an image frame can be partitioned into the interested and uninterested regions in the ROI applications. The position of the ROI need be embedded in the coding bit stream such that the decoder can exactly extract the ROI at good visual quality. However, the JPEG 2000 in part 1 comprising the maxshift coding scheme to embed the information of ROI does not need additional bits to store the position of the ROI, and its decoder can effectively decode the bit stream to obtain the good visual quality at the ROI.

The image coding has a function of ROI for enhancing the quality of the decoded image at the particular objects which are manipulated by using the enhancement techniques. These particular objects of an image are treated as the region of interest, which are provided by more bits to interpret themselves or are quantized by using small quantization steps in order to achieve good visual quality. The above mentioned techniques could enhance the perceptual effect of the decoded ROI, but the ROI is determined by using object segmentation and recognition or by user's hand operation. These two determination techniques of the ROI have the following disadvantages:

(1) Using the object segmentation and recognition to determine the ROI takes a lot of computation time, and cannot adjust the sizes of the recognized objects in the ROI to meet the bit-rate requirement; and
(2) Using the hand operation to select the fixed region of an image for the ROI also cannot adjust the size of the ROI to meet the bit-rate requirement.

Therefore, the present invention discloses a method for analyzing the coefficients after transformation and automatically determining the ROI from the transformed coefficients. To obtain good visual perception and quality of the decoded image, this invention explores the picture content and bit-rate requirement to generate an adequate size and location of the ROI during the encoding process.

SUMMARY OF THE INVENTION

It is an object of the present invention to provide a method for automatically determining the region of interest from an image which yields good visual perception and quality of the decoded ROI with consideration of the bit-rate requirement and the picture content to determine the adequate size and position of the ROI.

It is another object of the present invention to provide a method for automatically determining the region of interest from an image which discloses a scheme for automatically generating the ROI mask, of which size is adapted to the picture content and bit-rate requirement, at a low computational cost due to the mask generation embedded in the encoding process.

It is yet another object of the present invention to provide a method for automatically determining the region of interest from an image which discloses a scheme for generating the ROI embedded in the image encoding process which does not need the hand operation or image segmentation and recognition techniques.

To achieve these and other advantages and in order to overcome the disadvantages of the conventional methods in accordance with the purpose of the invention as embodied and broadly described herein, the present invention provides a method for generating the ROI mask in encoding process and produces the ROI according to the positions, frequencies and values of the transformed coefficients, and the bit-rate requirement. Further, the ROI mask is embedded in an output bit stream to avoid or reduce the bit-rate overhead.

BRIEF DESCRIPTION OF THE DRAWINGS

The accompanying drawing is included to provide a further understanding of the invention, and is incorporated in and constitutes a part of this specification. The drawing illustrates an embodiment of the invention and, together with the description, serves to explain the principles of the invention. In the drawing.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

Figure 3:
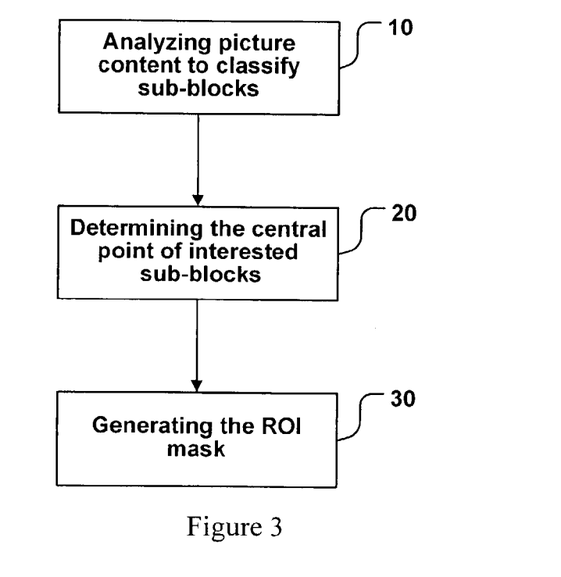
FIG. 3 is a flowchart view showing the compression steps of the present invention.

The present invention investigates the locations, frequencies and values of the transformed coefficients from an image to automatically determine the ROI of this image to avoid the usage of image segmentation and recognition or hand operation. Referring to FIG. 3, the present invention comprises the steps of:

Step 10, analyzing the locations, frequencies and values of the transformed coefficients from an image based on p×p-pixel sub-block, and then determining each sub-block to be the interested one or not;

Step 20, locating the central point of the interested sub-blocks from a geometric location point of view;

Step 30, integrating the interested sub-blocks from said central point to the image boundary by using the morphological process where a plurality of p×p-pixel sub-blocks are integrated to generate closed and continued regions, and the number of these closed and continued regions, the size of the ROI, is determined by the bit-rate requirement.

The above mentioned steps are designed for avoiding the disadvantages of the conventional methods.

At the step 10, the interested sub-blocks are determined in accordance with picture content. At the steps 20 and 30, the interested sub-blocks integrated from their central point are to form the ROI mask according to the requirements of transmission and compression. Additionally, the ROI mask is a closed and continued pattern by using the morphological process to enhance the quality of the decoded image.

In the automatic determination of the ROI mask, firstly, the values of the transformed coefficients at different frequencies are analyzed to understand the picture content and then to determine which sub-blocks can be the interested ones. Furthermore, the positions of the interested sub-blocks are considered to group these interested sub-blocks to become the closed ad continued ROI mask under the requirement of a bit rate.

The method of this invention can be applied to many compression techniques with discrete signal transformations. The locations, frequencies and values of the transformed coefficients can be utilized to automatically generate the ROI for each image. Hence, this invention is very suitable to the currently used image codec standards.

During an image compression process of the present invention, an image frame is partitioned to form a plurality of sub-blocks each of which is determined to be interested or uninterested one. The positions of the interested sub-blocks are used to generate the closed and continued regions that are the ROI mask to be embedded at the compression process.

In an embodiment of present invention, an image applied in the JPEG 2000 is transformed by the DWT and the transformed coefficients are processed by the EBCOT coding process of which the significant pass in the bit-plane coding is used to embed the ROI mask generated from the method of this invention. The determination of the significant pass in the EBCOT has two conditions as follows:

(a) if $\sigma_k(i, j)$ changing from 0 to 1 then it belonging to the significant pass, and (b) if $\sigma_k(i, j)$ being 1, its surrounding 8 pixels belonging to the significant pass.

The significant state, $\sigma_k(i, j)$, represents the coordinate position of the k-th bit-plane being (i, j), and k represents the index of the bit-plane from the most significant bit (MSB) to the least significant bit (LSB) where the initial value of $\sigma_k(i,j)$ is 0. The EBCOT takes bits in the bit-plane being significant when bits in the bit-plane are not equal to 0 in the condition (a). The effect of scanning pass does not only be an input of the coding process, but also has the frequency information of the transformed coefficients. Therefore, the characteristics of the EBCOT processing the DWT coefficients provide the significant pass to be input information for automatically determining the ROI.

Figure 4:
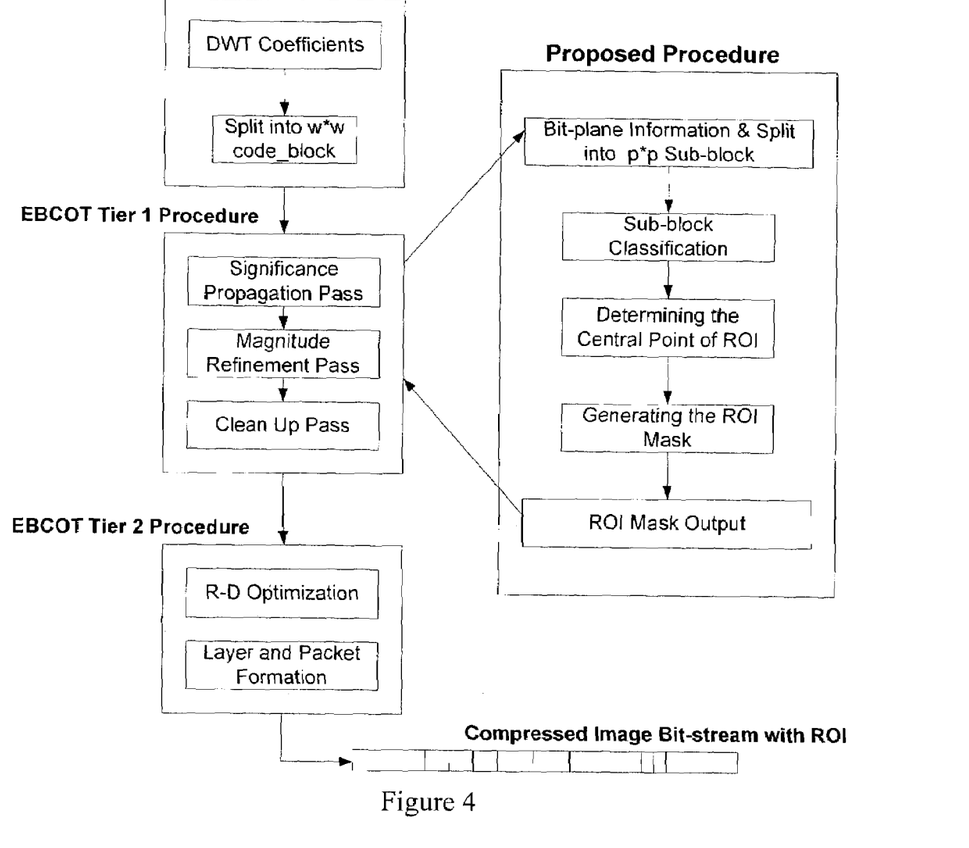
FIG. 4 is a block view showing the present invention to automatically determine the ROI mask.

The mechanism of automatically determining the ROI is divided to three steps and is embedded in the JPEG 2000 compression process, referring to FIG. 4, including the sub-block classification, central-point determination and mask generation.

At the step 10, the EBCOT codes a stripe, being 4×4-pixel, to be a coding unit. The $\sigma_k(i, j)$ represents the coordinate position of the significant state of the k-th bit-plane and the $b_k(i, j)$ represents the values of bits of the scanning pass to indicate whether the coordinate position of (i, j) belongs to the significant state. If $\sigma_k(i,j)$ is significant, $b_k(i, j)$ records "1". Otherwise, $b_k(i, j)$ records "0". The significant state of each bit-plane represents the picture content in accordance with the symbol of $Sum_N$, summing from the first to the N-th bit-plane, that is computed from MSB to LSB bit-plane. As a result, any inputted image could determine the required bit-planes according its content.

$$Sum_N = \sum_{i=0}^{n-1}\sum_{j=0}^{n-1} b_N(i, j) \qquad (1)$$

The N represents the number of bit-planes for summation, and n is to interpret the size of one side of the n×n-pixel codeblock during the pass coding process. For example, if the 64×64-pixel codeblock is used, n is equal to 64. When the $Sum_k$ at a particular k-th bit-plane is over ⅛ of the area of an image frame, from the experiments, the k-th bit-plane could be chosen as one for investigating picture contents. Additionally, stop computing Eq. (1) and let N be k. Furthermore, the step of sub-block classification uses the significant state of the k-th bit-plane to understand picture content.

Figure 5:
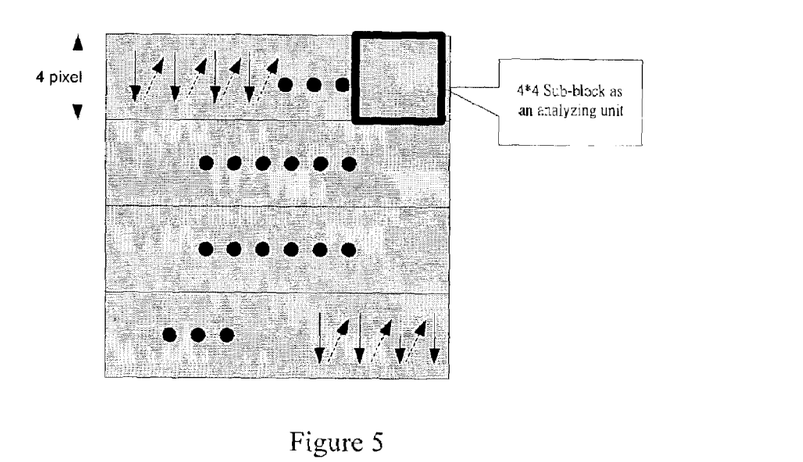
FIG. 5 is an illustrative view showing that using 4-pixel to be a scanning unit in the EBCOT coding process for orderly scanning the 64×64-pixel codeblock of the present invention.

The input data for sub-block classification come from the EBCOT information and does not directly come from the DWT coefficients. The EBCOT scans the DWT coefficients by using a 4-pixel unit and performs scans for each 64×64-pixel codeblock strip by strip. Referring to FIG. 5, strips are orderly preformed to scan each 64×64-pixel codeblock at one time. The coding process of the present invention uses the 4×4-pixel sub-block as a classification unit for the pass scanning information of EBCOT, and thereby the ROI is constructed by multiple sub-blocks. The approach could rapidly and instantly get the significant information of bit-planes to generate the ROI mask to clearly display the high-frequency components in the picture. For determining the number of bits in the significant state of a sub-block, the calculation can be formulated as follows:

$$B_k(i, j) = \sum_{p=i}^{i+3}\sum_{q=j}^{j+3} b_k(p, q), \qquad i, j = 0, 1, \ldots, (n/4) - 1. \qquad (2)$$

The $B_k$ is an integer from 0 to 16 and represents the number of bits in the significant state of a 4×4-pixel sub-block where n equaling to 64 interprets the 64×64-pixel codeblock and (i, j) represents the coordinate position of a sub-block. For the coefficients after DWT, the transformed coefficients represent the values at different frequencies. Consequently, we analyze $B_k$ of different sub-bands in DWT from low to high frequency in a chosen bit-plane. The $B_{k,LL}$ represents the number of bits in the significant state of sub-blocks at the low-low sub-band, LL_BAND. The $B_{k,HL}$, $B_{k,LH}$ and $B_{k,HH}$ represent the numbers at low-high high-low and high-high sub-bands, LH_BAND, HL_BAND and HH_BAND, respectively.

The analysis of $B_k$ at low-low, low-high, high-low and high-high sub-bands is described as follows.

(a) Analysis of $B_k$ at the low-low sub-band

Firstly, define a symbol of $\tilde{B}_k^L$ that is the product value of the number of the significant bits of sub-blocks at the low-low band multiplied with a weighting value of $t_1$ where the formula is described as follows:

$$\tilde{B}_k^L = t_1 * B_{k,LL} \qquad (3)$$

A threshold value, $T_f$, is utilized to classify the sub-block to be an interested one or not. This threshold value can be a half of the maximum value of $B_{k,LL}$ at the low-low sub-band where the formula is represented as follows:

$$T_f = \max(B_{k,LL})/2 \qquad (4)$$

When the $\tilde{B}_k^L$ is larger than $T_f$, the sub-block is viewed as a region with smooth content and high brightness.

(b) Analysis of $B_k$ at the low-high, high-low and high-high sub-blocks

The high-frequency regions are usually the edges, sharps and textures of objects in an image. General speaking, the interested region occurs at the edges of objects. After obtaining the smooth and brightness region at the low-low sub-band, we have to determine the edge information of objects that displays the variation of picture content at high-frequency DWT coefficients. Further, we investigate the numbers of the significant bits of the sub-blocks at the HL_BAND, LH_BAND and HH_BAND, where these three sub-bands represent the textures varying at different directions. Consequently, the numbers of the significant bits at these three sub-bands individually multiplies t2, t3 and t4 and the product results are summed together as follows:

$$\tilde{B}_k^H = t_2 * B_{k,HL} + t_3 * B_{k,LH} + t_4 * B_{k,HH} \qquad (5)$$

Here, a threshold value is required for classifying the sub-blocks belonging to the edge region or not. The threshold value, $T_e$, is determined as follows:

$$T_e = \max(B_{k,HL} + B_{k,LH} + B_{k,HH})/2 \qquad (6)$$

When the $\tilde{B}_k^H$ is larger than $T_e$, the sub-block is treated as the interested one with high-frequency content, representing the edge information. The interested sub-blocks are grouped to become the closed region for the initial ROI mask.

Additionally, that the location and size of the ROI are adapted according to the picture content and bit-rate requirement is achieved by choosing an adequate set of weighting values t2, t3 and t4, and a threshold value, $T_e$.

At the step 20, when the picture contains an object with low-frequency regions surrounded by high-frequency contours, this object is usually treated as an interested one from perceptual point of view. Hence, the viewer would like to see this object with high visual quality than the others in the picture. After obtaining the high-frequency sub-blocks, the central point is located according to the position distribution of these interested sub-blocks with the $\tilde{B}_k^H$ larger than the threshold value. If the top and bottom vertical coordinate positions of the interested sub-blocks are $T\_B_k$ and $B\_B_k$, respectively, and the left and right horizontal coordinate positions of the interested sub-blocks are $L\_B_k$ and $R\_B_k$, respectively, the coordinate position of the central point could be obtained by the following formula:

$$(m, n) = \left(\frac{T\_B_k + B\_B_k}{h}, \frac{L\_B_k + R\_B_k}{v}\right) \quad (7)$$

The central point, (m, n), of the ROI mask is computed according to the positions of the high-frequency sub-blocks. The h and v are the values determined by the position distribution of high-frequency sub-blocks to rapidly obtain the central point close to the geometric center of the ROI.

At the step 30, the closed and continued ROI mask is generated by searching from the central point to the image boundary and integrating the low-frequency and high-frequency sub-blocks that are classified as the interested ones. The morphology, one of the image processing methods, modifies the shape of sub-blocks to form the ROI mask according to the following equation.

$$ROI\_mask = (\{\tilde{B}_k^L, \tilde{B}_k^H\} \circ C) \cap C \quad (8)$$

The symbol of ROI_mask represents the ROI mask. The symbol of C represents the mask of erosion and dilation operations, and the "o" and "∩" represent dilation and erosion operations, respectively. According to Eq. (8), the dilation operation is to perform the OR function between the grouped sub-blocks and mask C, and the erosion operation is to perform the AND function between the result after a dilation operation and mask C. Additionally, for adaptively generating a ROI mask relating to the picture content and bit-rate requirement, the interested sub-blocks are searched from the central point to the boundary of an image frame, and with consideration of bit-rate requirement, a part of or all of the interested sub-blocks are selected to go through morphological process to form the closed and continued ROI mask.

Figure 6:
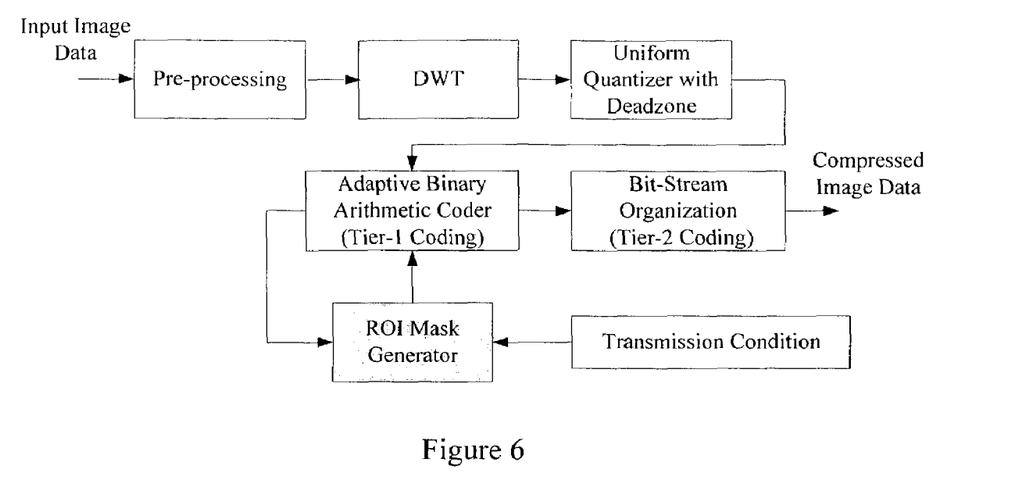
FIG. 6 is an illustrative view showing the method for generating the ROI mask at the process of the JPEG 2000 of the present invention.

The generation scheme of the ROI mask embedded in the JPEG 2000 encoding process is shown as FIG. 6. After an input image goes through the DWT and quantization, information of the significant state of a particular bit-plane is obtained and analyzed from the EBCOT coding process to generate the required ROI mask with adaptation to picture content and bit-rate requirement. Further, the coding process returns the ROI mask to the Tier_2 coding of EBCOT and rearranges the bit-stream with ROI information. Finally, the output bit-stream comprises the ROI feature and can be decoded to generate the reconstructed image with enhancing the visual quality in the ROI, especially, at a limited bandwidth.

Figure 7A:
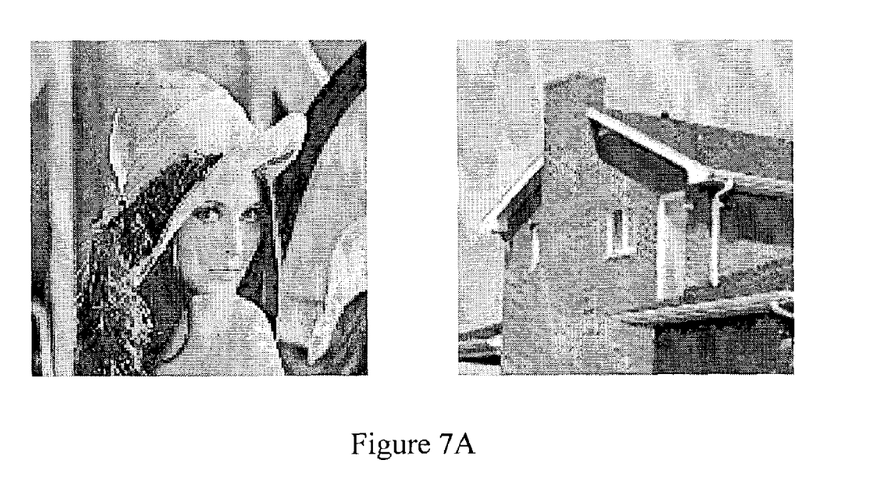
FIG. 7A shows the original Lena and House images.
Figure 7B:
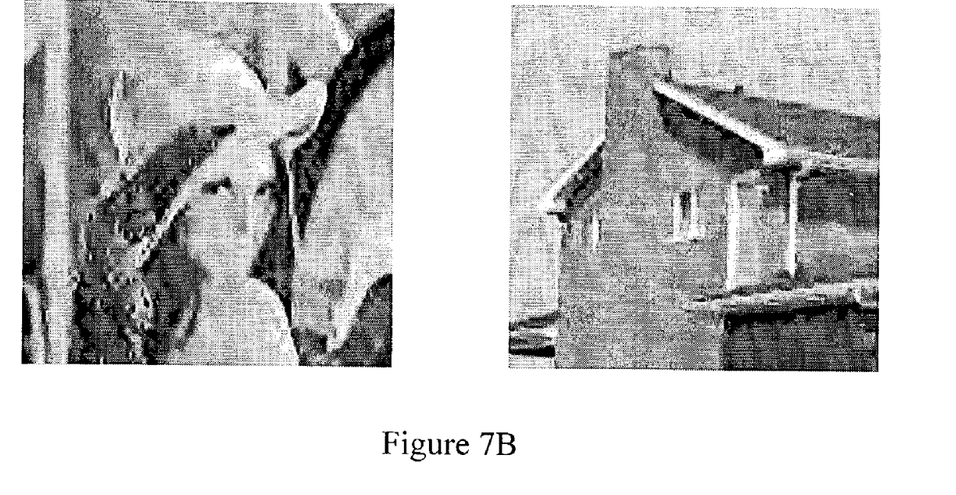
FIG. 7B shows the Lena and House images decoded from the JPEG 2000.
Figure 7C:
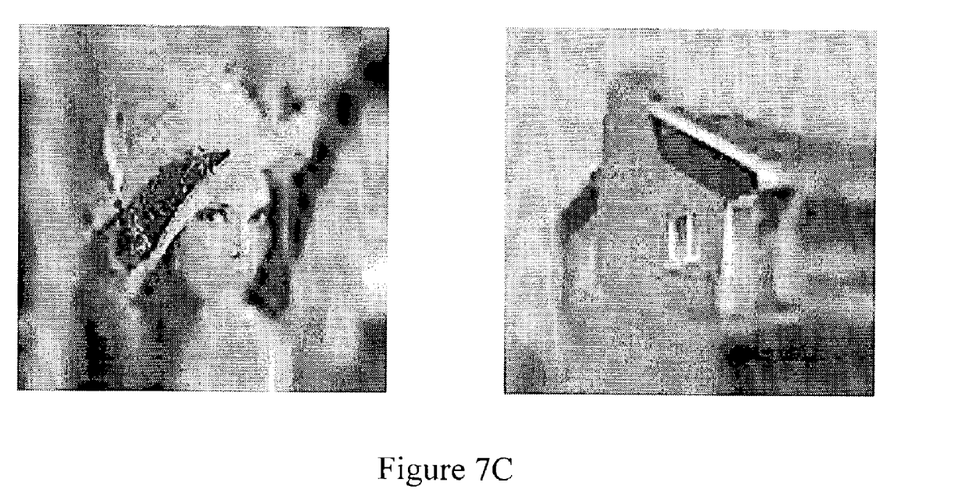
FIG. 7C shows the Lena and House images with the fixed-square ROI mask decoded from the JPEG 2000.
Figure 7D:
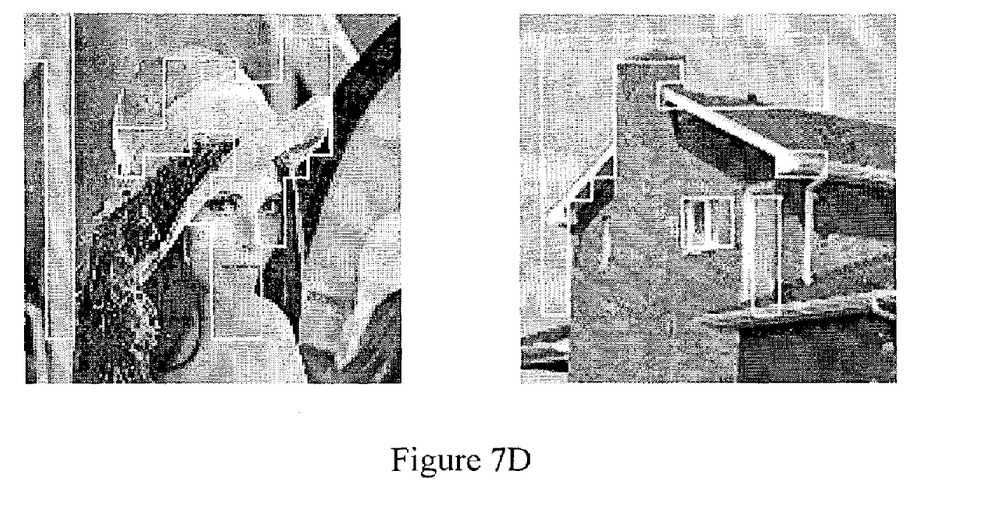
FIG. 7D shows the ROI masks of the Lena and House images determined by the present invention.
Figure 7E:
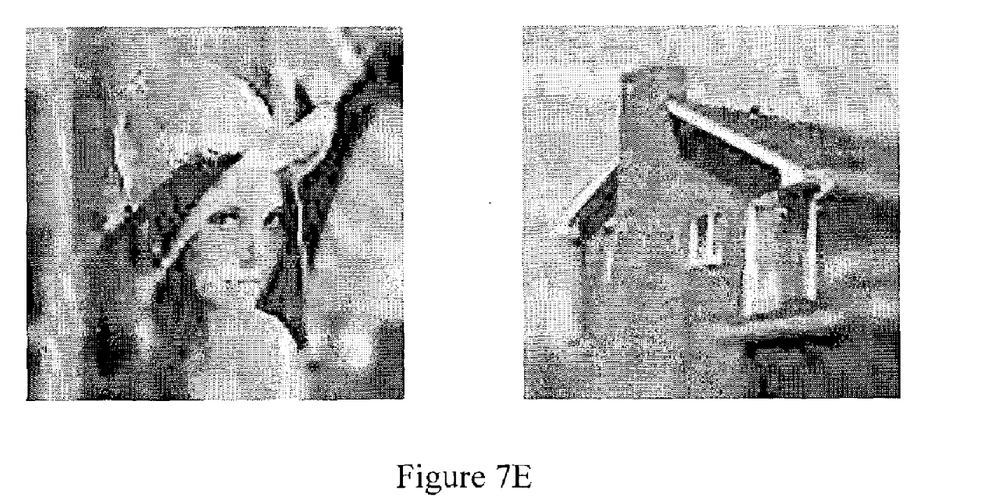
FIG. 7E shows the Lena and House images with the ROI masks in FIG. 7D decoded from the JPEG 2000.

Referring to FIGS. 7A to 7E, the two images of Lena and House are coded by JPEG 2000 at a bit rate of 0.4 bits per pixel (bpp) using the fixed-square ROI mask, and the ROI mask automatically generated by this invention. FIG. 7A shows the original images, and FIG. 7B shows the decoded images from the conventional JPEG 2000. Further, referring to FIG. 7C, the images with the fixed-square ROI mask being ⅓ of the size of original images are decoded from JPEG 2000. Referring to FIG. 7D, the selected regions with white lines show the ROI masks automatically determined by the present invention, and the FIG. 7E depicts the decoded images with the ROI mask shown in FIG. 7D from JPEG 2000. In accordance with above mentions, the ROI mask generated by this invention includes high gray-level values of pixels because these pixels are easy to belong the ROI according to the significant state of the bit-plane at the low-low sub-band. Additionally, when considering the bit-planes at the other sub-bands, the edges of an object are easy to belong to the ROI. Comparing FIG. 7C and FIG. 7E, the decoded images using the ROI masks in FIG. 7D have better visual quality than the ones using the fixed-square ROI masks at a bit rate of 0.4 bpp.

Figure 8A:
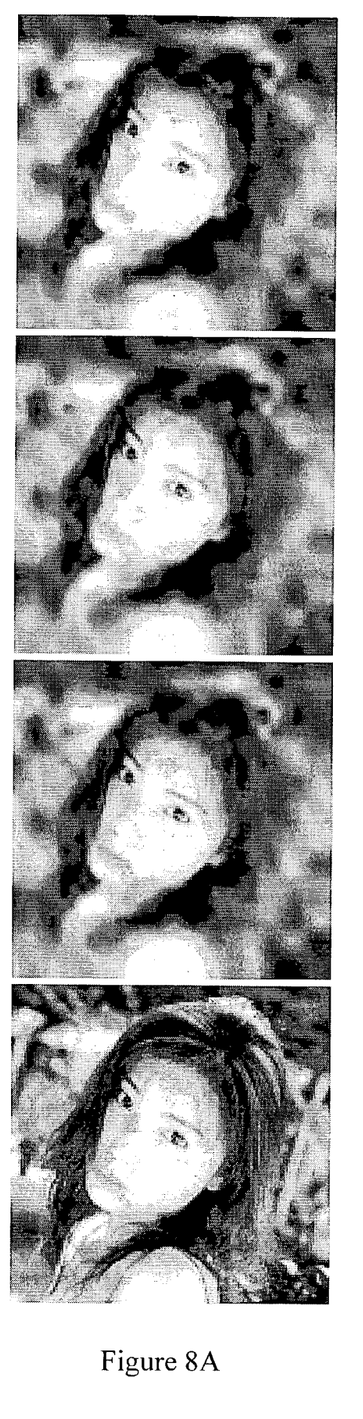
FIG. 8A shows the decoded images from the JPEG-2000 using the fixed-square ROI mask at different bit rates of the prior art.
Figure 8B:
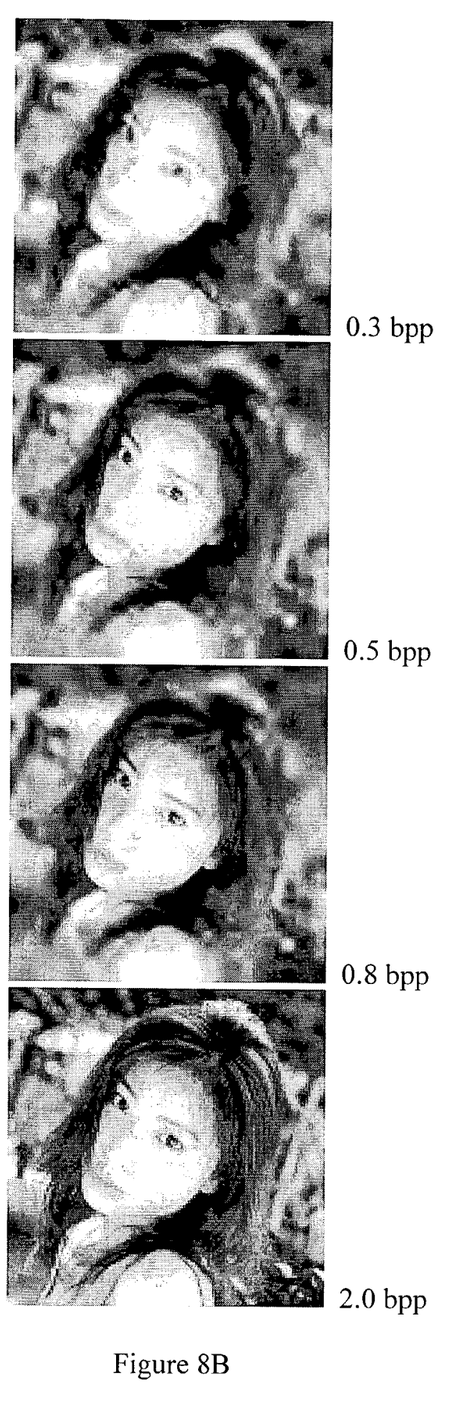
FIG. 8B shows the decoded images from the JPEG 2000 using the automatic-generation ROI mask at different bit rates of the present invention.

Referring to FIGS. 8A and 8B, the decoded images from the JPEG 2000 use the fixed-square ROI masks and the ROI masks of the present invention, respectively, at bit rates of 0.3 bpp, 0.5 bpp, 0.8 bpp and 2.0 bpp for images from top to bottom. When the bit rate being 0.3 bpp, 0.5 bpp or 0.8 bpp shows a small bandwidth, the decoded images using the ROI masks of the present invention have clearer faces and face contours than the ones using the fixed-square ROI masks, because the ROI mask of the present invention effectively extracts the interested region form a picture, and the bit rate does not be wasted in the background or the uninterested region. As for a high bit rate of 2.0 bpp, the decoded two images have low loss at their whole picture quality to degrade the impact of the JPEG 2000 with ROI function such that visual quality of these two images is almost the same.

The advantage of the ROI option in the JPEG 2000 is that the ROI of an image could be decoded as possible at a low bit rate or limited bandwidth. When the normal bandwidth or high bit-rate is allowable, user can decode the whole image with good quality. Therefore, the ROI of the present invention shows good visual quality of the decoded image from low to high bit rates.

Advantages of the Invention

The method of the present invention for automatically determining the region of interest from an image to generate the ROI mask with considering the bit-rate requirement has many advantages as follows:

1. The method of the present invention embedded in the encoding process automatically generates the ROI mask instead of using a hand operation or image segmentation and recognition.
2. The method for automatically determining the region of interest from an image by using easy mathematical equations has lower computational complexity than the conventional ones.
3. The present invention discloses a method with analyzing the transformed coefficients of the coding process to get the high-frequency and low-frequency information that is used to classify the sub-blocks and then generates the ROI with adaptation to picture content.

Therefore, the foregoing is considered as illustration only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for automatically determining the region of interest from an image comprising the steps of:
   (a) analyzing the transformed coefficients of an image to investigate picture content and partitioning an image into the interested and background (uninterested) regions that are based on p×p-pixel sub-blocks for performing classification;
   (b) locating the central point of the interested sub-blocks; and
   (c) integrating a plurality of interested p×p-pixel sub-blocks from said central point to the boundary of an image frame to generate a closed and continued region of interest by using a image processing technique with considering the bit-rate requirement.

2. The method for automatically determining the region of interest from an image in accordance with claim 1, wherein said image is compressed by the JPEG standard.

3. The method for automatically determining the region of interest from an image in accordance with claim 1, wherein said image is compressed by the JPEG 2000 standard.

4. The method for automatically determining the region of interest from an image in accordance with claim 1, wherein a 8×8-pixel blocks of an image go through the discrete cosine transform to understand the picture content at the frequency domain, and a threshold value determined from the picture content is used to classify which sub-blocks are the interested ones during the JPEG coding process.

5. The method for automatically determining the region of interest from an image in accordance with claim 1, wherein said image goes through the discrete wavelet transform are partitioned into a plurality of 4×4-pixel sub-blocks where the threshold values are determined by the bit-planes in different sub-bands to decide which sub-blocks are the interested ones during the JPEG 2000 coding process.

6. The method for automatically determining the region of interest from an image in accordance with claim 1, wherein said image goes through a discrete signal transformation and the transformed coefficients are partitioned to p×p-pixel sub-blocks where the threshold values are determined by the content of the transformed coefficients to decide which sub-blocks are interested ones.

7. The method for automatically determining the region of interest from an image in accordance with claim 1, wherein the central point of the interested p×p-pixel sub-blocks is rapidly obtained by multiplying the weighting values with the values of the top, bottom, left and right coordinate positions of the interested sub-blocks.

8. The method for automatically determining the region of interest from an image in accordance with claim 1, wherein a plurality of sub-blocks are integrated from the central point to the boundary of an image frame, and go through the signal processing like the morphological process of dilation and erosion operations to form the closed and continued ROI of which size is adapted according to the bit-rate requirement.

9. A method for automatically determining the region of interest from an image comprising the steps of:
   (a) analyzing the transformed coefficients of an image to investigate picture content wherein said image comprising the interested and background (uninterested) regions that are based on sub-blocks for performing classification;
   (b) locating the central point of the interested sub-blocks; and
   (c) integrating said sub-blocks for generating a region of interest.

10. The method for automatically determining the region of interest from an image in accordance with claim 9, wherein said image is compressed by the JPEG standard.

11. The method for automatically determining the region of interest from an image in accordance with claim 9, wherein said image is compressed by the JPEG 2000 standard.

12. The method for automatically determining the region of interest from an image in accordance with claim 9, wherein a 8×8-pixel blocks of an image go through the discrete cosine transform to understand the picture content at the frequency domain, and a threshold value determined from the picture content is used to classify which sub-blocks are the interested ones during the JPEG coding process.

13. The method for automatically determining the region of interest from an image in accordance with claim 9, wherein said image goes through the discrete wavelet transform are partitioned into a plurality of 4×4-pixel sub-blocks where the threshold values are determined by the bit-planes in different sub-bands to decide which sub-blocks are the interested ones during the JPEG 2000 coding process.

14. The method for automatically determining the region of interest from an image in accordance with claim 9, wherein said image goes through a discrete signal transformation and the transformed coefficients are partitioned to sub-blocks where the threshold values are determined by the content of the transformed coefficients to decide which sub-blocks are interested ones.

15. The method for automatically determining the region of interest from an image in accordance with claim 9, wherein the central point of the interested sub-blocks is rapidly obtained by multiplying the weighting values with the values of the top, bottom, left and right coordinate positions of the interested sub-blocks.

16. The method for automatically determining the region of interest from an image in accordance with claim 9, wherein, a plurality of sub-blocks are integrated from the central point to the boundary of an image frame, and go through the signal processing like the morphological process of dilation and erosion operations to form the closed and continued ROI of which size is adapted according to the bit-rate requirement.

* * * * *